United States Patent [19]
Altares et al.

[11] Patent Number: 4,548,045
[45] Date of Patent: Oct. 22, 1985

[54] METHOD FOR CONTINUOUSLY PRODUCING POP-SHAPED FROZEN CONFECTIONS

[75] Inventors: Romulo A. Altares, Mercerville, N.J.; David S. Gibson, Madison, Wis.; Michael A. Goyda, Newark, Del.; Joseph L. Hegadorn, Ridgewood, N.J.; Virendra N. Kapoor, Mount Kisco, N.Y.

[73] Assignee: General Foods Corporation, White Plains, N.Y.

[21] Appl. No.: 595,077

[22] Filed: Mar. 30, 1984

[51] Int. Cl.4 .............................................. F25D 13/06
[52] U.S. Cl. ........................................ 62/63; 62/64; 62/345; 62/374; 62/380
[58] Field of Search ....................... 62/63, 64, 66, 345, 62/374, 380; 426/524

[56] References Cited

U.S. PATENT DOCUMENTS

| | | | |
|---|---|---|---|
| 3,114,248 | 12/1963 | Morrison | 62/380 |
| 3,695,895 | 10/1972 | Brown | 62/345 |
| 3,857,974 | 12/1974 | Aref et al. | 62/64 |
| 3,965,270 | 6/1976 | Epstein | 62/64 |
| 4,073,158 | 2/1978 | Guiller | 62/64 |
| 4,336,274 | 6/1982 | Ross et al. | 62/64 |

Primary Examiner—Ronald C. Capossela
Attorney, Agent, or Firm—Thomas R. Savoie; Barbara Toop D'Avanzo; Daniel J. Donovan

[57] ABSTRACT

A method for continuously producing pop-shaped frozen confections at line speeds exceeding 20 cycles per minute is disclosed. A conveyor system for transporting pop-shaped metal molds is provided. The molds are filled with a flowable confection so that the top portions of the molds are left unfilled. The molds are then transported into a freezing zone to partially freeze the contents. A stick is inserted into the partially frozen contents of each mold. Next, a liquid cryogen, such as liquid nitrogen, is added to each mold to cover the exposed surface of the material. The liquid cryogen is then vaporized and the molds are removed from the freezing zone. Then, the completely frozen, pop-shaped confections are removed from each mold and immersed in a water bath to form an encapsulating ice shell thereon. The ice-coated frozen confections may be subsequently packaged.

6 Claims, No Drawings

METHOD FOR CONTINUOUSLY PRODUCING POP-SHAPED FROZEN CONFECTIONS

TECHNICAL FIELD

The present invention relates to a method for continuously producing pop-shaped frozen confections at line speeds of 20 cycles or more per minute. More particularly, the invention involves freezing the exposed surface of a partially frozen confectionery material contained in a mold by flowing a liquid cryogen thereon. A typical liquid cryogen is liquid nitrogen.

BACKGROUND ART

Numerous devices are known in the art for freezing frozen confections, particularly frozen confections containing sticks so that the confections may be held by the stick while being eaten. Most of the devices are similarly configured, comprising a large number of inverted molds on a conveyor. The molds are conveyed past a suitable filling apparatus and into a freezing zone wherein a refrigerated liquid is typically contacted with the outsides of the mold to freeze the contents. At a pre-determined point in the freezing zone, sticks are inserted into the then partially frozen contents of the mold. The frozen confections are discharged from the molds upon exiting the freezing zone. In most instances, the confections are simply packaged and storaged for later consumption. In other instances, such as for pudding-based or gelatin-based frozed confections, the confections are dipped in a water bath to form an encapsulating ice shell in order to prevent dehydration of the produce upon storage. If the confections are not thoroughly frozen prior to being dipped in the water bath, the ice coating will not form properly, giving rise to the possibility of dehydration. The problem is particularly acute for the top part of the confection which is typically exposed to ambient air.

While it is possible to insure thorough freezing of the entire confection by constructing a freezing unit of greater capacity of lengthening the residence time of the molds in the freezing zone, such as by slowing down the conveyor, such alternatives are not commercially optimal. The aforementioned freezing units are most often marketed according to only one set of specifications, typically adapted to the freezing of ice cream, and customizing the unit by requiring greater freezing capacity is prohibitively expensive. Moreover, slowing down the conveyor is equally impractical because of the desired level of productivity, preferably in excess of 20 cycles per minute. Thus, some other method of achieving acceptable productivity while insuring thorough freezing of the entire frozen confection must be used.

The use of liquid nitrogen and other liquid cryogens for freezing foods is known in the art. For instance, U.S. Pat. No. 3,114,248 to Morrison discloses placing a food in an open-face pan, sprinkling the surface with liquid nitrogen to form a frozen crust thereon and subsequently immersing the whole pan in liquid nitrogen to rapidly freeze the contents. It is known, however, that such rapid freezing leads to the formation of very fine ice crystals. Such fine ice crystals are undesirable in most frozen confections in which it is most preferable to have an ice crystal size between 10 and 150 microns. Thus, the exclusive use of a liquid cryogen is not practical for increasing the productivity of freezing frozen confections.

It is an object of the present invention to provide a method for continuously producing pop-shaped frozen confections at line speeds exceeding 20 cycles per minute.

DISCLOSURE OF THE INVENTION

It has now been found that the objects of the invention are met by a method which involves providing an endless conveyor system transporting a series of uniformly-spaced, depending, pop-shaped metal molds. The molds are filled with a flowable confectionery material so that the top portion of the molds remain unfilled. The molds are then conveyed into a freezing zone so that the outer surfaces of the molds are in direct contact with a refrigerated liquid having a temperature above $-50°$ C. A stick is inserted into each partially filled mold while the mold is in the freezing zone and while the confectionery material is in a partially frozen state. A liquid cryogen, typically liquid nitrogen, having a boiling temperature below $-75°$ C. at atmospheric pressure is flowed into each of the partially filled molds in the freezing zone so that the liquid cryogen covers the exposed surface of the confectionery material and thus completely freezes the top portion of that confectionery material contained in the mold. The molds are removed from the freezing zone and the completely frozen pop-shaped confections are then removed from each mold. The frozen confections are immersed completely in a water bath so as to form an encapsulating ice shell about each confection. The ice-coated frozen confections may then be packaged for later sale.

An endless conveyor system is provided for transporting a series of uniformly-spaced, depending, pop-shaped, metal molds throughout the freezing process. The term "pop-shaped" refers to the oblong shape known in the art normally associated with frozen confections on a stick. The pop-shaped molds depend vertically from the conveyor so that they can contain the flowable confectionery material placed in the molds prior to entering the freezing zone. While it is not strictly necessary to construct the molds out of metal, it is most preferable to do so because metal is best suited for efficient heat transfer and to the thermal cycling to which the molds will be subjected.

As the endless conveyor progresses along its track, the molds are conveyed past a filler and subsequently filled with a flowable confectionery material. Inasmuch as the invention is directed to increasing productivity, it is desirable to fill the molds at a rate of at least 20 cycles per minute, otherwise known as operating the method at line speeds exceeding 20 drops per minute. The molds are filled with the flowable confectionery material so that the top portion of the molds remain unfilled in order to provide an area for the liquid cryogen to be applied and collected. There is no upper limit to the portion left unfilled but both productivity and efficiency suffer if too much of the mold is left unfilled. It is therefore preferable to leave 5 mm. of the upper portion of the mold unfilled for the application of the liquid cryogen so that adequate liquid cryogen may be applied to freeze the surface of the pop.

The method of the present invention is useful for producing a wide variety of frozen confections. For instance, the invention is applicable to the production of pudding-based as well as gelatin-based frozen confections. So too, a dual-phased material comprising a cream and gelatin-containing phase and a fruit phase may be produced by the present method. In short, those frozen confections which consist of flowable confectionery material prior to freezing may be produced by the method of the present invention.

Once the molds have been filled with a flowable, frozen confectionery material but with the top portion left unfilled, the partially filled molds are conveyed into a freezing zone. In the freezing zone, the outer surfaces of the metal molds are directly contacted with a refrigerated liquid at a temperature above −50° C. The temperature is maintained above −50° C. so that proper ice crystal growth size, preferably to between 10 microns and 150 microns is promoted. If the refrigerated liquid is at a temperature much below −50° C., the confectionery material will tend to freeze too quickly, promoting the growth of very fine ice crystals and imparting an undesirable texture to the frozen confection. Suitable refrigerated liquids include those liquids which are not frozen or unduly viscous at temperatures of −50° C. and above. Exemplary of such liquids are a concentrated brine solution or ethylene or propylene glycol.

A stick is inserted into each mold at a point along the freezing zone at which the confectionery material is in the partially frozen state. Obviously, once the confectionery material is frozen solid it becomes extremely impractical if not impossible to adequately insert the stick. On the other hand, if the stick is placed in the mold while the material is still flowable, the stick will not stay where it is inserted. Thus, the stick should be inserted at those points at which the confectionery material is pliant enough to permit insertion but sufficiently frozen to support the stick. Such a sufficiently pliant yet frozen state will be readily apparent to a worker skilled in the art after one or two trials. The insertion of the stick causes lumps of partially frozen material to form on the bottom of the confection. These lumps are particularly difficult to freeze by chilling only the exterior surface of the mold. This difficulty is compounded for an aerated confectionery which tends to have a reduced thermal conductivity.

Thus, after the stick is inserted into the mold, a liquid cryogen at a temperature below −75° C. is flowed into each of the plurality filled molds so as to cover the exposed surface of the partially frozen confections. The effect of flowing the liquid cryogen into the molds is to completely freeze the top segment of the confectionery material which is otherwise difficult to freeze, owing to the exposed surface. Suitable liquid cryogens are those often inert gases which liquify at temperatures below −75° C. Most preferably, the liquid cryogen is liquid nitrogen, which liquifies at −195° C. Liquid nitrogen is widely available commercially and is safe for use with foods. One of the advantages of the use of liquid cryogens is that the cryogens evaporate rapidly at ambient pressure. So, the liquid cryogens can be flowed into the molds and subsequently evaporated quickly to completely freeze the top segment of the confectionery material contained in the molds.

The molds containing the frozen confections are transported out of the freezing zone after the liquid cryogen has been applied and subsequently evaporated. The completely frozen pop-shaped confections are then removed from each mold. Depending on the type of frozen confection and the length of time that it is to be stored, the frozen confection may be packaged for later scale. For some types of confections though, particularly pudding-based and gelatin-based frozen confections, it may be preferable to encapsulate the confection in an ice shell, particularly if the confections are to be stored for a period of months. Each such frozen confection is completely immersed in a water bath to form an encapsulating ice shell. The ice encapsulated confection may then be packaged for later sale. The formation of the ice shell is greatly aided by the prior application of the liquid cryogen to the upper portion of the confectionery material. Otherwise, the molds would have had to remain in the freezing zone longer, impairing productivity. Even then, there is some risk that the ice shell would not form properly on the exposed surface of the confection in the mold, increasing the chance of dehydration of the confection upon storage.

It has surprisingly been found that the ice crystal size of the frozen confection is relatively uniform throughout. As noted hereinabove, immersion of a food in a liquid cryogen tends to lead to the formation of very fine ice crystals due to the extremely rapid freezing. It has been found, however, that flowing the liquid cryogen onto the exposed base of the partially frozen confection does not lead to the formation of the very fine ice cyrstals. Thus, the ice crystal size is relatively uniform, typically in the 10 to 150 micron range, produced by the slower brine freezing.

What is claimed is:

1. A method for continuously producing pop-shaped frozen confections at line speeds exceeding 20 cycles per minute, said frozen confections having a relatively uniform ice crystal size from top to bottom, said method comprising:
   (a) providing an endless conveyor system said conveyor system transporting a series of uniformly spaced, depending, pop-shaped, metal molds;
   (b) filling said molds with a flowable confectionery material such that the top portion of the molds remain unfilled;
   (c) conveying said partially filled molds into a freezing zone wherein the outer surface of the metal molds is in direct contact with a refrigerated liquid having a temperature above −50° C.;
   (d) inserting a stick into each filled mold in said freezing zone while the confectionery material is in a partially frozen state;
   (e) flowing a liquid cryogen having a temperature below −75° C. into each of the partially filled molds present in said freezing zone, the added cryogen being in an amount sufficient to cover the exposed surface of the confectionery material and to completely freeze the top segment of the confectionery material contained in the mold;
   (f) allowing the liquid cryogen contained in the molds to vaporize;
   (g) removing the molds from said freezing zone;
   (h) removing the completely frozen pop-shaped confections from each mold;
   (i) completely immersing each frozen confection in a water bath in order to form an encapsulating ice shell about each confection; and
   (j) packaging the ice-coated frozen confections.

2. A method as in claim 1 wherein the liquid cryogen is liquid nitrogen.

3. A method as in claim 1 wherein the mold is partially filled so that at least the remaining upper 5 mm of the mold remains unfilled.

4. A method as in claim 1 wherein the flowable confectionery material is a pudding material.

5. A method as in claim 1 wherein the flowable confectionery material is a gelatin material.

6. A method as in claim 1 wherein the flowable confectionery material is a dual-phased material comprising a cream and gelatin-containing phase and a fruit phase.

* * * * *